United States Patent [19]

Siddoway et al.

[11] Patent Number: 4,582,511

[45] Date of Patent: Apr. 15, 1986

[54] PROCESS FOR SUPPRESSING THE DUSTING OF COAL

[75] Inventors: Mark A. Siddoway, Houston; Donald E. Hardesty, Brookshire; John R. King, Bellville; William C. Machmer, Sugarland, all of Tex.

[73] Assignee: Shell Oil Company, Houston, Tex.

[21] Appl. No.: 694,740

[22] Filed: Jan. 25, 1985

[51] Int. Cl.$^4$ .......................... C10L 9/00; C10L 5/24
[52] U.S. Cl. .......................................... 44/6; 44/15 B
[58] Field of Search .................................. 44/6, 15 B

[56] References Cited

U.S. PATENT DOCUMENTS

| | | | |
|---|---|---|---|
| 1,860,465 | 5/1932 | Kokiarek | 44/6 |
| 1,910,975 | 5/1933 | Wallace | 44/6 |
| 1,988,999 | 1/1935 | Cunningham et al. | 44/6 |
| 2,436,146 | 2/1948 | Kleinicke | 44/6 X |

FOREIGN PATENT DOCUMENTS 19064 of 1929 Australia .............................. 44/15 B

*Primary Examiner*—Carl F. Dees

[57] ABSTRACT

Coal dusting is controlled by spraying the coal with a relatively viscous aqueous solution of sugar or sugar and other components of sugar-forming plants.

10 Claims, 4 Drawing Figures

PROCESS FOR SUPPRESSING THE DUSTING OF COAL

BACKGROUND OF THE INVENTION

The present invention relates to controlling the dusting of coal. More particularly, it relates to an improved process for treating coal with a dust suppressing liquid.

The problems of coal dusting are well known, for example, as described in the article by W. H. Miller, "Coal Dust Control", Coal Technology 1980 Volume 3, 3rd International Coal Utilization Exhibition and Conference, Houston, Texas, 1980, pages 285–320. As far as Applicants are aware, the prior treatments with dust suppressing liquids have been limited to uses of water, water containing a surfactant, oils or waxes, or the like.

Release of fugitive dust from coal, i.e., particles less than about 100 micrometers in size, is a major problem. This problem is encountered throughout the coal handling industry—at the mine, at transfer points, and at utilities or other points of utilization. The problem may be compounded due to the close proximity of transfer points and utilities to populated or environmentally sensitive areas.

Commercially available dust suppression systems include devices which capture entrained dust, induce the dust to settle, or contain the dust. However, the most common method is to wet the coal with water to prevent dusting. Water is inexpensive and large quantities can be added to eliminate dust. But, adding water decreases the specific heating value of the coal. This increases the total weight that must be moved and handled from the treating point and hence increases handling and transportation costs. However, the flow properties of water-wetted coal also may be adversely affected. In addition, the decrease in the specific heating value of the coal may require derating of a utility's power plant due to weight limited devices such as pulverizers.

Water or surfactant-doped water provides a bridge or binder between the dust particles. This bridge is not extremely strong and is volatile. Thus, the bridge can be eliminated by evaporation, and this in turn requires further water addition. When dried coal with no surface moisture is handled, there is no water to agglomerate the dust particles. Consequently, untreated dried coal is dusty and may require more water to suppress dust. This could potentially offset the effect of drying. But, since volatile water has been removed, a nonvolatile agent can be applied to agglomerate the dust.

SUMMARY OF THE INVENTION

The present invention relates to a process for treating coal with a dust suppressing liquid. The coal is contacted with the liquid in a situation and manner such that (a) the coarser particles of the coal are wetted preferentially relative to the smaller dust forming particles of less than about 100 microns in size, (b) the coarser particles are wetted to an extent providing agglomeration sites along their surfaces, and (c) the wetted particles are moved into repeated contact with the dust-forming particles. The liquid with which the coal is contacted is a pumpable but relatively viscous aqueous solution or dispersion, which preferably contains components of sugar-forming plant material.

DESCRIPTION OF THE INVENTION

Figure 1:
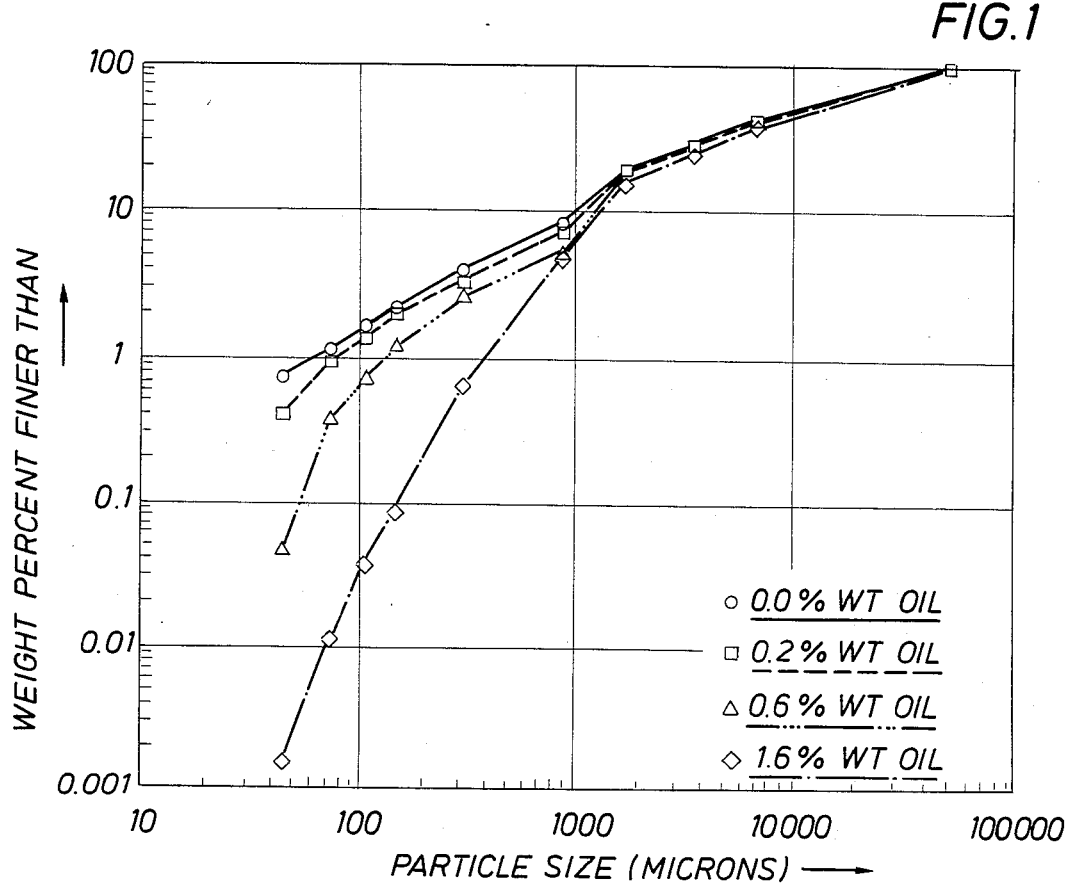
FIG. 1 (prior art) illustrates particle size distributions of dried Western sub-bituminous coal before and after spraying with atomized oil.

The present invention is, at least in part, premised on a discovery that the effectiveness of a coal dust suppressing liquid is strongly dependent upon both the composition of the treating liquid and the method of its application. A particularly suitable treating liquid comprises a pumpable but relatively viscous aqueous liquid solution (such as one having an effective viscosity of about 10 to 10000 centistokes at 25 degrees Centigrade as measured by a capillary viscometer).

An especially suitable treating liquid comprises a substantially homogeneous dispersion of sugar-forming plant materials, such as those contained in molasses, hydrol, black-strap, residual syrups, mother liquors, bagasse, sorgo molasses, wood molasses, or corn molasses and/or beet or cane sugar juices formed during the raw preparation or refining of sugar. Liquids containing these materials can exhibit non-Newtonian behavior such as being thixotropic. Thus, effective viscosities are given as measured by capillary viscometers.

Hereafter, "viscosity" will be used in place of "effective viscosity".

The present plant-material-containing, or "molasses", treating liquids can be composed of ash, amino acids, proteins, organic acids, sugar anhydrides, and various types of sugar and decomposition products. These materials may also be resinified with acids and are known to carbonize or caramelize at high temperatures. These materials can also contain gums and/or high molecular weight or polymeric material. The molecules contained in these liquids have both hydrophobic and hydrophilic functional groups which allow good bonding to a substance such as coal which has both hydrophilic and hydrophobic functional groups.

The molasses can be applied at room temperature. In a particularly preferred procedure, the treating liquid has a minimum amount of water and is heated to a temperature above the ambient or room temperature, such as about 80 to 200 degrees Fahrenheit, at the time of its application and is preferentially applied to relatively coarse coal particles.

The treating liquid can also be applied to fine coal particles to bind two or several particles together and make an agglomerate that cannot easily become entrained or airborne and cause a dusting problem. The treatment process is ideally suited to coal without surface moisture such as thermally dried coal. With coal without surface moisture, a strong bridge between two coal particles is easily established.

The treating liquid is preferably applied to the coarser particles while the coal is being dropped from one point to another. The application should be with a heated atomizing nozzle onto cool (e.g., ambient room temperature) coal. This takes full advantage of the liquid dust suppression agent so that it is applied in droplets fine enough to provide several sticky sites on the coal surfaces and is viscous enough when in contact with the coal to prevent its migration into the fine pore structure of the coal. When using aqueous treating liquids, water also evaporates from the fine droplets forming a more viscous material on the coal's surface than that which was atomized. The result is a provision of agglomeration points on the coarse particles which will contact dust and bind the dust to the larger particles. Molasses could also be applied with hydraulic type nozzles, but this would be sub-optimal due to the relatively large droplet sizes produced. The treating liquid could also be applied with sonic nozzles or as a foam or emulsion. The emulsion may be used to extend the effect of the treating liquid so that less could be applied to obtain the desired effect.

Molasses typically contains 10–30% weight water. Handling and application are aided by diluting the molasses with water to make it less viscous. Dust suppression is enhanced by concentrating the molasses (i.e., by removing water). Hence, while the molasses may be diluted with water for handling, application should evaporate some of this water in order to have concentrated molasses on the surface of the coal.

Annual worldwide production of molasses was approximately 31.8 million metric tons in 1979–1980. The major outlet is currently as cattle and animal feed. Hence, large quantities of molasses are available at reasonable prices.

Oil spraying using crude, residual, or fuel oil is practiced commercially. However, we have found that its effect can be improved by the present method of preferential wetting, and more effective in eliminating dust.

The change in the particle size distribution when atomized oil is applied to coarse coal is given in FIG. 1. The dust suppression experiments were performed on dried Western sub-bituminous coal but are applicable to any coal with no surface moisture. The dust suppression agent was applied with an unheated atomizing nozzle. Hence, the optimum method was not used. The coal was split into + and −¼" fractions, and the beginning particle size distribution was determined. The coarse coal was shaken in pans below the nozzle while the agent was being applied. The coarse sticky coal was then mixed with the fine coal, and the final particle size distribution was determined. This tests some endurance of the dust suppression effect since the measuring of a particle size distribution requires shaking of the coal on screens for classification.

Figure 2:
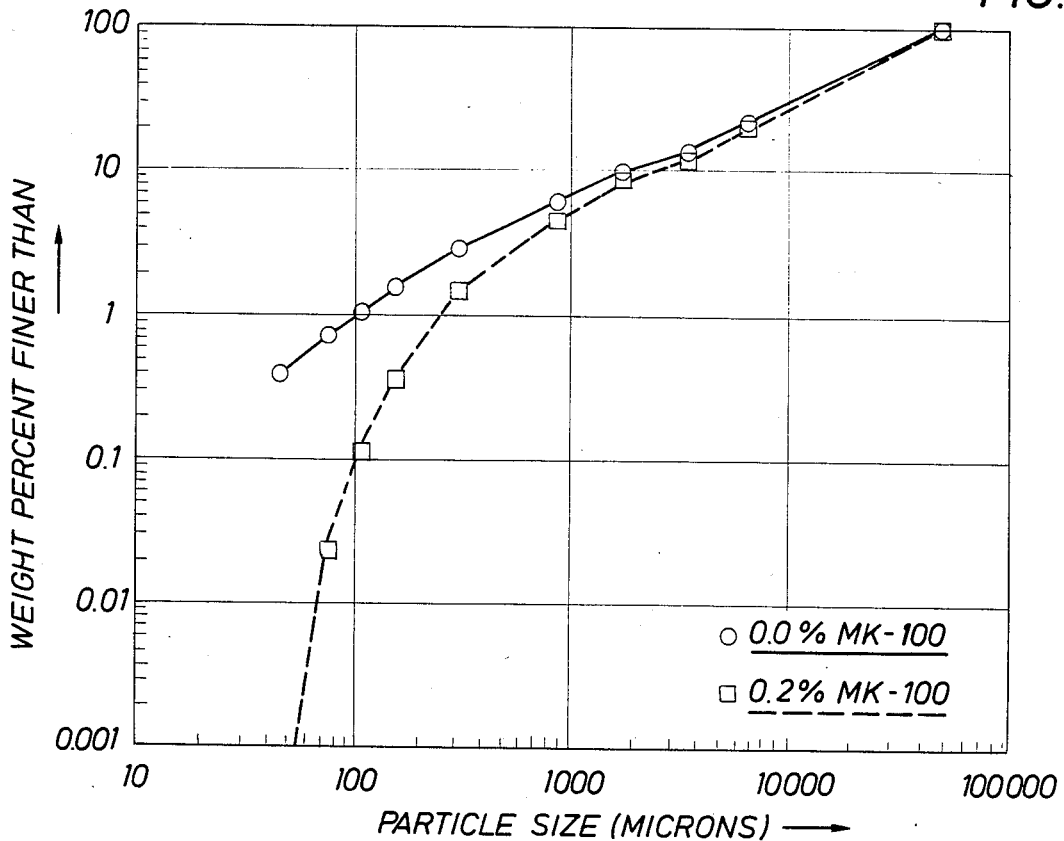
FIGS. 2 and 3 show particle size distributions of such a coal before and after spraying with atomized molasses.
Figure 3:
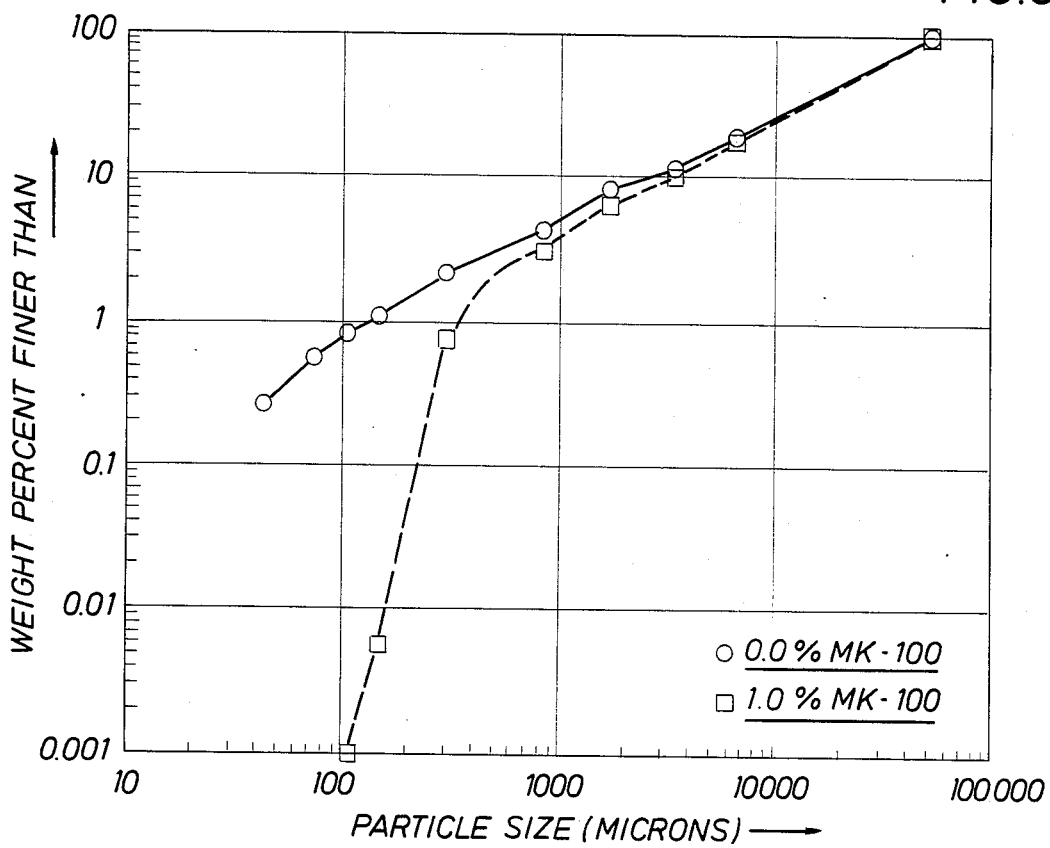

For molasses, the changes in the particle size distributions are given in FIGS. 2 and 3. Molasses eliminates more dust at lower application levels than oil. And the present application method largely acts on the problem dust—i.e., particles with small diameters, e.g., less than about 100 microns. The test results are summarized in Table 1. Problem dust, composed of hazing dust and entrainable dust, is largely eliminated at 0.2% MK-100 and totally eliminated at 1.0% MK-100. Hazing dust includes particles with diameters less than 44 microns and is easily entrained in moving air and appears over belts of moving coal. Entrainable dust includes particles with diameters less than 100 microns and will not settle near a transfer point.

TABLE 1

| | \% MK-100 | | | | | |
|---|---|---|---|---|---|---|
| | 0.2 | | | 1.0 | | |
| TYPE OF DUST | BE-FORE | AF-TER | % REDUC-TION | BE-FORE | AF-TER | % REDUC-TION |
| HAZING | 0.38 | 0.001 | 100 | 0.27 | 0.001 | 100 |
| EN-TRAIN-ABLE | 1.02 | 0.11 | 89 | 0.85 | 0.001 | 99.9 |

DUST REDUCTION USING SHELL MK-100*

*A commercially available molasses having a viscosity of about 1200 centistokes at 25 degrees Centigrade.

Figure 4:
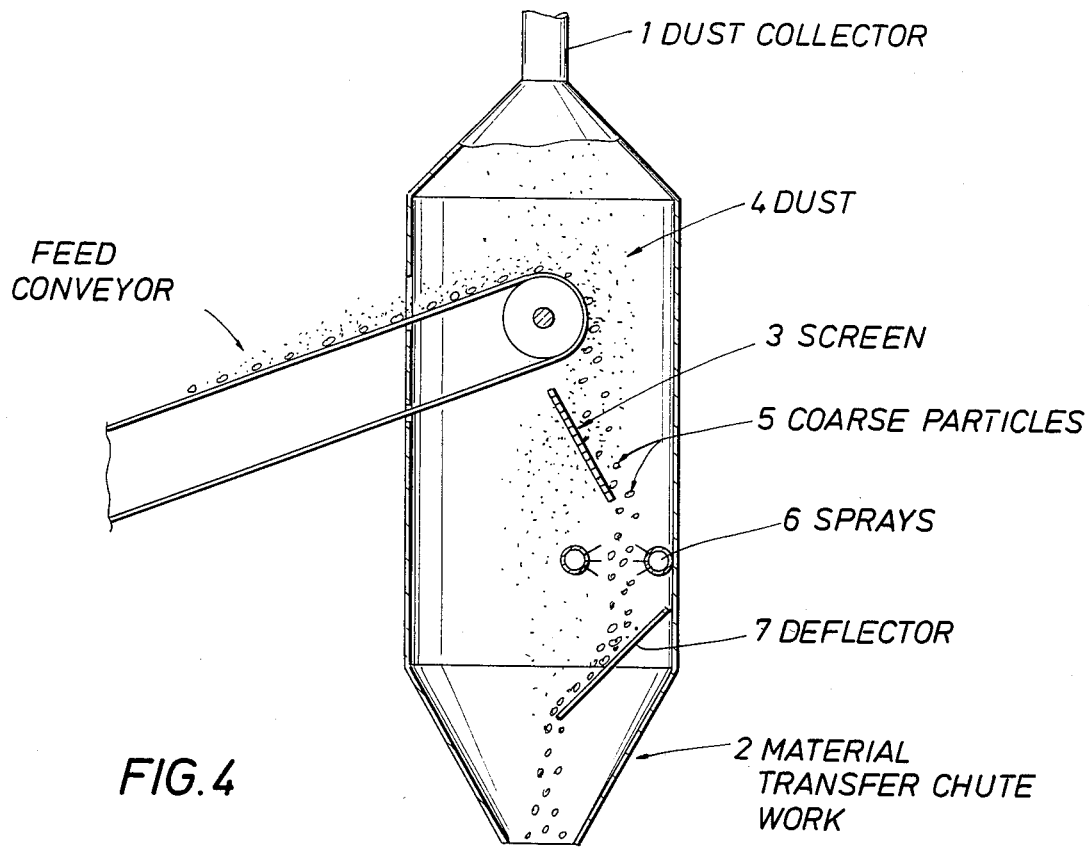
FIG. 4 shows a method of preferentially applying the treating liquid to the coarse coal particles.

FIG. 4 illustrates a preferred method of preferentially applying a treating liquid in accordance with the present invention. As shown, a modification can be made in the interior of a material transfer chute, which can be a conventional type of chute such as one containing a dust collector 1 above a material transfer chute work 2. A screen 3 is positioned to separate at least some dust particles 4 from the coarse particles 5. At least one spray 6 is positioned to spray treating liquid preferentially onto the separated coarse particles and at least one deflector 7 or other mixing means is positioned so that the wetted coarse particles are forced into repeated contacts with the dust particles.

Although the present invention is not premised on any particular theory or mechanism, it appears that the treating liquid should be applied to the relatively coarse coal for the following reasons:

1. The coarser coal particles have the most inertia and, during handling, will travel farther than fine particles. Thus, they tend to move through the dust clouds in a manner causing repeated contacts between the sticky particles and the dust particles.

2. The coarse particles have fissures and cracks. These are friable points. The dust suppression agent will penetrate the larger cracks. When fracturing occurs, fewer dust particles will be produced. And, any sticky sites remaining on the fragments can help collect particles produced by other fractures. There is evidence that coarse particles degrade more than fine particles when drying and there is a decrease in the top size of the coal as it is being handled. These observations imply that the larger particles are more friable than the finer particles. Hence, it is advantageous to apply the dust suppression agent to the larger particles.

3. The segregation needed for a preferential application of treating agent to the coarser particles can be easily obtained. Some examples are listed below:

A. While a silo is being loaded with 2"×0 coal, coarse particles settle more quickly than problem dust particles. Thus, there is a constant dust cloud which is largely composed of problem dust. Incoming coal can be sprayed with the dust suppression agent near but below the drop point and allowed to essentially scrub the air below collecting fine dust particles still airborne due to prior dumping. It is optimal to apply the spray to the coarse particles and have the sticky sites collect only problem dust particles. This could be accomplished by physically screening the coal before it is put into the silo and dumping the fine coal below the coarse coal. Another possibility is to entrain the problem dust and inject this dust laden air stream into the silo below the point at which the coarse coal is added. The air velocity can be selected to entrain only problem dust. In general, it is preferable that treated, sticky coal drop through and scrub air containing problem dust.

B. It is also possible to use a specially designed transfer point or a specially designed vessel where the fine and coarse particles are contacted in a similar manner to that explained above.

C. An additional possibility is to spray the coarse coal on a belt. This could be done in one application or in staged applications (e.g. before and after transfer points). It could also be applied to coal that is being physically agitated.

The present invention can be employed in treating substantially any coal containing dust-forming fine particles at substantially any stage in a coal handling or treating process. Examples of suitable types of coal include anthracite, bituminous, sub-bituminous, lignite, brown, and thermally dried or upgraded coals. Upgraded or thermally dried coals include processed coal such that the specific heating value of the coal is increased by the processing.

In general, the treating liquid used in the present process can comprise substantially any pumpable but relatively viscous liquid, which is preferably an aqueous liquid solution or substantially homogenous dispersion containing sugar and other components of sugar-forming plants. The various grades of molasses and/or cane or beet sugar juices produced in the raw processing or refining of sugars having viscosities of from about 10 to 10,000 centistokes at 25 degrees Centigrade are particularly suitable. The viscosity can be changed by removing water so that the molasses approaches a solid or by adding water so that the viscosity approaches that of water. The viscosity can also be raised or lowered by lowering or raising the temperature respectively.

Typical magnitudes of these effects are shown in Table 2 for an industrial grade molasses. The viscosity can also be influenced by the composition of the molasses as discussed by A. G. Keller in the Encyclopedia of Chemical Technology (2nd Edition, pp. 613-633, John Wiley & Sons, New York, 1967).

TABLE 2

VISCOSITIES OF AN INDUSTRIAL GRADE MOLASSES
(As Received at 79.5 degrees Brix[3])

| Temperature, K. | Viscosity in Centistokes | | | | | |
|---|---|---|---|---|---|---|
| | −10% Wt[1] Water | −5% Wt[1] Water | As Received | +10% Wt[2] Water | +25% Wt[2] Water | +50% Wt[2] Water |
| 297 | 11200 | 2660 | 909 | 180 | 47 | 14 |
| 303 | 6000 | 1480 | 548 | 124 | 35 | 12 |
| 313 | 2350 | 674 | 280 | 70 | 23 | 9 |
| 324 | | 346 | | 44 | | |

[1]Obtained by evaporating water from As Received molasses.
[2]Obtained by adding water to As Received molasses.
[3]A measure of the density. 79.5 Brix has the same density as a 79.5% sucrose solution.

Although the treating liquids can be applied to the coal in substantially any manner conducive to a preferential wetting of the relatively coarse particles, the treating liquids are preferably applied by spraying them at a temperature of from about 80° to 200° F. at a location in which the coal particles are falling and at least a significant proportion of the fugitive dust particles have become airborne and moved out of direct contact with the spray being applied to the coarser particles. Spraying devices with atomizing nozzles are preferred and those capable of atomizing relatively hot and relatively viscous liquids are particularly preferred. Examples of known and available spraying devices include the following:

A. Atomizing nozzles where a gas such as air or an inert gas is used to atomize a liquid such as those nozzles and systems manufactured by Spraying Systems Company.

B. Ultrasonic atomizing nozzles such as those manufactured by Sono-Tek Corporation.

C. A nozzle or other device which makes fine droplets out of a liquid stream such as a hydraulic nozzle.

D. A nozzle or system which produces a foam or emulsion.

What is claimed is:

1. In a process for treating coal with dust suppressing liquid, an improvement comprising:
    drying the coal to an extent needed for providing a water content which is insufficient for binding dust particles to larger particles;
    segregating dust particles from larger particles;
    treating the larger particles with liquid in a situation and manner such that the larger particles are wetted preferentially with the treating liquid relative to dust forming smaller particles, and are wetted to an extent providing agglomeration sites along their surfaces;
    mixing the dust particles and larger particles so that the treated larger particles are repetitively contacted by the dust particles; and
    using as said treating liquid a pumpable but relatively viscous aqueous liquid consisting essentially of a solution of sugar and other components of sugar-forming plant material which solution tends to become sticky as it dries.

2. The process of claim 1 in which the temperature of the treating liquid being applied is about 80° to 200° F.

3. The process of claim 2 in which the temperature of the coal to which the liquid is applied is significantly less than that of the liquid.

4. The process of claim 1 in which the larger particles are mechanically separated from the dust forming smaller particles while the coal is being dropped from one point to another prior to a preferential application of the treating liquid to the larger particles.

5. The process of claim 1 in which the treating liquid is molasses or a cane or beet sugar juice which is substantially equivalent to molasses having a viscosity of from about 10 to 10,000 centistokes at 25° C.

6. The process of claim 4 in which the treating liquid is molasses.

7. A process for treating coal with a pumpable, but relatively viscous, dust suppressing liquid comprising:
    separating at least some of the dust particles from the coarser particles;
    preferentially contacting the separated coarser particles with the treating liquid; and
    mechanically forcing the liquid-wetted coarser particles into contact with the dust particles.

8. The process of claim 7 in which the treating liquid is an aqueous liquid containing sugar-forming plant material.

9. The process of claim 7 in which the temperature of the treating liquid being applied is about 80° to 200° F.

10. The process of claim 7 in which the temperature of the coal to which the liquid is applied is significantly less than that of the liquid.

* * * * *